United States Patent
Shan et al.

(10) Patent No.: US 7,274,408 B2
(45) Date of Patent: Sep. 25, 2007

(54) [METHOD OF MOTION DETECTION FOR 3D COMB FILTER VIDEO DECODER]

(75) Inventors: Pei-Ming Shan, Hsinchu (TW); Uriah Peng, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 473 days.

(21) Appl. No.: 10/708,851

(22) Filed: Mar. 29, 2004

(65) Prior Publication Data

US 2005/0134742 A1   Jun. 23, 2005

(51) Int. Cl.
*H04N 9/78* (2006.01)
*H04N 9/64* (2006.01)

(52) U.S. Cl. .............. 348/669; 348/699; 348/700; 348/701; 348/665; 348/667

(58) Field of Classification Search ............... 348/669, 348/700, 665, 667, 701, 699, 670, 663, 452, 348/451
See application file for complete search history.

(56) References Cited

U.S. PATENT DOCUMENTS

| | | | | |
|---|---|---|---|---|
| 5,003,389 A | * | 3/1991 | Isobe et al. | 348/555 |
| 5,146,318 A | * | 9/1992 | Ishizuka et al. | 348/669 |
| 5,311,306 A | * | 5/1994 | Tanaka et al. | 348/702 |
| 5,473,389 A | * | 12/1995 | Eto et al. | 348/669 |
| 5,502,509 A | * | 3/1996 | Kurashita et al. | 348/669 |
| 5,541,669 A | * | 7/1996 | Yamaguchi et al. | 348/669 |
| 5,585,861 A | * | 12/1996 | Taniguchi et al. | 348/669 |
| 5,589,888 A | * | 12/1996 | Iwasaki | 348/669 |
| 5,990,978 A | * | 11/1999 | Kim et al. | 348/663 |
| 6,288,754 B1 | * | 9/2001 | Ito | 348/663 |
| 6,400,762 B2 | * | 6/2002 | Takeshima | 375/240.01 |
| 6,674,488 B1 | * | 1/2004 | Satoh | 348/663 |
| 6,774,954 B1 | * | 8/2004 | Lee | 348/665 |
| 6,822,691 B1 | * | 11/2004 | Kim et al. | 348/452 |
| 6,995,804 B2 | * | 2/2006 | Kwon et al. | 348/663 |
| 7,084,928 B2 | * | 8/2006 | Tanigawa | 348/663 |
| 2005/0134744 A1 | * | 6/2005 | Shan et al. | 348/670 |

* cited by examiner

*Primary Examiner*—David Ometz
*Assistant Examiner*—Jean W. Désir
(74) *Attorney, Agent, or Firm*—Jianq Chyun IP Office

(57) ABSTRACT

The invention is directed to a method of 3-dimensional (3D) comb filter video decoder. The composite video signal is sampled to obtain multiple sampling data $F_m P_{x,y}$, which represents the $y^{th}$ pixel of the $X^{th}$ line in the $m^{th}$ frame, in which m, x, y are positive integer. After using $F_{m+1}P_{x,y}$, $F_m P_{x,y}$, $F_{m-1}P_{x,y}$, and $F_{m-2}P_{x,y}$ to judge whether the composite video signal is the motion state or the still state. The motion detection is based on the composite video signal without separation of luma and chroma. As a result, the motion detection can be precisely judged.

8 Claims, 5 Drawing Sheets

[METHOD OF MOTION DETECTION FOR 3D COMB FILTER VIDEO DECODER]

CROSS REFERENCE TO RELATED APPLICATIONS

This application claims the priority benefit of Taiwan application serial no. 92136373, filed on Dec. 22, 2003.

BACKGROUND OF INVENTION

1. Field of Invention

The present invention relates to a method of motion detection. More particularly, the present invention relates to a 3-dimensional (3D) comb filter video decoder in NTSC type.

2. Description of Related Art

In the modern daily life, people can see various events without stepping out from a living place. For example, people can see images of landscape scene, news, or playing program, which are transmitted from the TV station to the TV apparatus. Even further, for the monitoring system of the local community, people at home can see the monitoring image taken by the camera, so as to know the outside status. The foregoing various video systems have their individual function and purpose. However, the video signals should be transmitted from the transmitting side to the receiving side.

The color is basically composed by three primary colors of red (R), green (G), and blue (B). In this manner, when the transmitting side intends to transmit the video image, the color information for R, G, and B are converted into electric signals and the electric signals are transmitted out. However, due to the transmitting bandwidth having its limitation, in order to save the bandwidth, the color information of R, G, and B are transformed into information of luminance (luma) and chroma. For example, the color space of Y(luma)UV (chroma) is an example for transforming the RGB information into luminance and chroma. The relation between the RGB color space and the YUV color space is Y=0.299R+0.587G+0.114B; U=0.493(B−Y); V=0.877(R−Y). In Y equation, the coefficients for R, G, and B are the sensitive level for the human eye to the three primary colors. U and V represent blue and red after the luma is removed. For a white light with R=G=B, the quantity of U and V are both zero, which represents no color.

During the process of transmitting the signals, the chroma data should be modulated into a subcarrier signal and is mixed with the luma data. As a standard made by National Television Standards Committee (NTSC), the Y, U, V information are modulated into a composite video signal of Y+U sin(ωt)+V cos(ωt) and then transmitted, wherein ω=2π(Fsc), and Fsc is the subcarrier frequency.

After receiving the composite video signal at the receiver, the signal is sampled. A comb filter, usually, samples the composite video signal by a frequency with four times of Fsc. As a result, each NTSC horizontal line has 910 sampling points, and an NTSC frame has 525 horizontal lines. The total number of sampling points is 910*525=477750. Since the number of sampling points for the whole image frame is not an integer factor of the number of horizontal lines, a phase difference would occur at the different sampling location.

In general, the most difficult part on the technology in the TV decoder is the separation of the luma signal and the chroma signal. The separation quality of the luma and the chroma would affect the decoding quality of the decoder. For this reason, in the current application with the requirement of high-quality image, the technology of 3D comb filter is taken to achieve the separation of luma and chroma.

When the composite video signal is decoded by the 3D comb filter, the composite video signal is sampled by every 90 degrees of the phase angle. Taking the NTSC as the case, when sampling phases are at 0, 0.5π, π, and 1.5π, the quantities of Y+V, Y+U, Y−V, and Y−U are respectively obtained. FIG. 1 is a drawing, schematically illustrating a portion of sampling result in the frame for the NTSC system. In FIG. 1, the vertical axis is the position x of the horizontal line in the frame, and the horizontal axis is the position y of the pixel in the horizontal line. When the two sampling data are corresponding to the same position but in the adjacent frames, the two sampling points has a separation by 477750 sampling points (factors of 4 with remainder of 2), and then the two phases are just have the difference of 180 degrees. The foregoing sampling relation for the adjacent frames can be shown in FIG. 1, but the vertical axis is treated as the sequence m of the frame, that is, the vertical axis is the time axis.

FIG. 2A is a block diagram, illustrating the conventional 3D comb filter. In FIG. 2A, usually, the 3D comb filter includes inter-frame Y/C separator 210, intra-field Y/C separator 220, that is, 2D comb filter, motion detector 230, memory 240, and mixer 250. The composite video signal 201 is obtained by sampling, wherein $F_{m+1}$ represents the composite video signal 201 for the $(m+1)^{th}$ frame. The memory 240 stores the composite video signal 201 and provides the composite video signal 202 and the composite video signal 205, wherein $F_m$ represents the composite video signal for the $m^{th}$ frame. The intra-field Y/C separator 220 receives the composite video signal 205, and uses the space relation between the pixels in the frame $F_m$ to perform the Y/C separation, and then exports the separated video signal 221.

Usually, the separation for the motion video signal is done by using the intra-field Y/C separator 220. However, when the intra-field Y/C separator 220 processes the still video signal, it causes the drawbacks of blur edge. In order to improve the image quality, conventionally, the still video signal is processed by the inter-frame Y/C separator 210. The inter-frame Y/C separator 210 receives the composite video signals for the frames $F_{m+1}$ and $F_m$ at the same time, and the timing relation between the corresponding pixels in the adjacent frames $F_{m+1}$ and $F_m$ is used for Y/C separation, and then the separated video signal 211 is exported. The motion detector 230 is used to judge whether or not the composite video signal 201 is in motion state or in still state. The conventional motion detector 230 receives the composite video signal 201 and the luminance data 221a that is provided by the separated video signal 221. The luminance data 221a and the composite video signal 201 are used to calculate the difference of luma and chroma between the two frames, which are used to judge the pixel state of motion or still, and then a selection signal 231 is exported. The mixer 250, according to the selection signal 231, selects the separated video signal 221, the separated video signal 211, or the mixed signal by a predetermined ratio, and the exports the separated video signal 251.

The motion detector 230 is the essential part for the 3D comb filter. When an error of treating motion state as the still state, it causes an obvious mistake on the image. However, if most of judgments in conservation manner are treated as the motion state, then the effect of the 3D comb filter is reduced. The convention method for detecting the motion is respectively calculating out Y/C values for the previous frame and the current frame, and comparing the difference.

FIG. 2B is a block diagram, illustrating the conventional motion detector for the 3D comb filter. In FIG. 2B, for the NTSC, after the composite video signal 201 goes through the low pass filter (LPF) 260, the data approximate to the luma data 232 can be obtained. The frame buffer 291 causes a delay for the frame and then the luma data 233 for the previous frame is obtained. It is compared for the current luma data 232 with the previous luma data 233 to obtain the luma difference 234. In addition, after the composite video signal 201 goes through the band pass filter (BPF) 270 and a subtraction of the luma data 221a, which is provided by the separated video signal calculated by the intra-field Y/C separator 220, is performed, so as to obtain chroma data 236. The frame buffers 292, 293 are used to have the delay by two frames, so as to obtain the chroma data 238 for the previous second frame. The chroma data 236 is subtracted by the previous second chroma data 238, so at to obtain the chroma difference 239. After the detection circuit 280 obtains the luma difference 234 and the chroma difference 239, the maximum is treated as the motion factor.

Conventionally, when the composite video signal 201 is judged for the motion/still state, quantity of the motion factor is often compared with a predetermined threshold value. If the motion factor is clearly greater than the threshold value, then it is judged as a motion state, in which the detection circuit 280 exports the selection signal 231 to use the intra-field Y/C separator 220. If the motion factor is clearly less than the threshold value, then it is judged to be the still state. The detection circuit 280 exports the selection signal 231 to use the inter-frame Y/C separator 210. The image quality is improved. If the motion factor is around the threshold value, it is improper to determine the motion state or the still state. Usually, the luma data and the chroma data respectively calculated by the intra-field Y/C separator 220 and the inter-frame Y/C separator 210 are mixed by a proper ratio, so as to treat this ambiguous situation. Therefore, if the motion factor is more tending to be difficult in convergence, the ambiguous region is certainly larger. The benefit from the 3D comb filter would be reduced a lot.

In conventional method for detecting the motion, the Y/C data are first calculated by a simple 2D Y/C separation, and then the Y/C data for the current frame is compared with that of the previous frame. According the comparing result, the Y/C data to be exported is determined. Here, it is a dilemma about the question of which one is the first for the chicken or egg. If the 2D Y/C separation process can be performed at the beginning to precisely separate the luma data and the chroma data, the 3D comb filter is then not necessary, and the motion factor is not necessary to be calculated. However, if the calculation for the luma data and the chroma data at the beginning has the error, then it also has the error for calculating the motion factor by using the luma data and the chroma data with error. The precision becomes much poor when the motion factor with error is used to determine the final luma data and the chroma data.

SUMMARY OF INVENTION

The invention provides a method of motion detection for a 3D comb filter video decoder in NTSC system. The original composite video signal is used as the reference for motion detection.

The invention provides a method of motion detection for a 3D comb filter video decoder in NTSC system. The method first samples the composite video signal to obtain and store a plurality sampling data $F_m P_{x,y}$, wherein $F_m P_{x,y}$ represents the sampling data for the composite video signal in the $m^{th}$ frame at the $x^{th}$ line and the $y^{th}$ pixel, in which m, x, and y are integer number greater than 0. The data of $F_{m+1}P_{x,y}$, $F_m P_{x,y}$, $F_{m-1}P_{x,y}$, and $F_{m-2}P_{x,y}$, are used to judge the composite video signal to be motion state or still state.

According to the method of motion detection for a 3D comb filter video decoder of the invention, the process to judge the composite video signal to be motion state or still state includes using $F_{m+1}P_{x,y}$, $F_m P_{x,y}$, $F_{m-1}P_{x,y}$, and $F_{m-2}P_{x,y}$ to calculate and obtain a number of maximum differences $MD_{x,y}$, in which $MD_{x,y}$ represents the maximum difference for the point at the $x^{th}$ line and the $y^{th}$ pixel. After then, the maximum difference values for any four of the adjacent pixels is taken and an average value is obtained by the averaging operation. A number of motion factors $MF_{x,y}$ are thereby obtained, and the judgment is determine the motion state or the still state for the composite video signal at the $x^{th}$ line and the $y^{th}$ pixel.

According to the method of motion detection for a 3D comb filter video decoder of the invention, the process for sampling the composite video signal is using a sampling frequency, which is four times of the frequency of the subcarrier signal in the composite video signal. In addition, the subcarrier signal is sampled at the phases of 0, 0.5π, π, and 1.5π. The formula for calculating the $MD_{x,y}$ is $MD_{x,y}=$ Max$\{|F_m P_{x,y}-F_{m-2}P_{x,y}|, |F_{m+1}P_{x,y}-F_{m-1}P_{x,y}|\}$.

According to the method of motion detection for a 3D comb filter video decoder of the invention, the $MF_{x,y}$ is obtained by first selecting the maximum differences for any four adjacent pixels including the $MD_{x,y}$ and taking an average, so as to obtain a number of averaged maximum differences $AMD_{x,h}$, wherein $AMD_{x,h}$ represents the averaged maximum difference for the $h^{th}$ pixel in $x^{th}$ line and h is an integer. The calculation formula is $AMD_{x,h}=(MD_{x,h}+MD_{x,h+1}+MD_{x,h+2}+MD_{x,h+3})/4$. A minimum is obtained from a number of adjacent averaged maximum differences, and a motion factor $MF_{x,y}$ is obtained, wherein the $MF_{x,y}$ represents the motion factor for the $y^{th}$ pixel in the $x^{th}$ line. The calculation formula, for example, is $MF_{x,y}=$Min $(AMD_{x,y}, AMD_{x,y-1}, AMD_{x,y-2}, AMD_{x,y-3})$, or $MF_{x,y}=$Min $(AMD_{x,y}, AMD_{x,y-3})$, and so on. They are within the invention scope.

According to the method of motion detection of the invention, the process for detecting the motion factor $MF_{x,y}$ to judge whether the composite video signal to be the motion state or the still state for the $y^{th}$ pixel in the $x^{th}$ line comprises providing a threshold value. And then, the $MF_{x,y}$ is compared with the threshold value, wherein the $y^{th}$ pixel in the $x^{th}$ line of the composite video signal is judged as the motion state when the $MF_{x,y}$ is greater than the threshold value, otherwise the still state is judged. Wherein, the $MF_{x,y}$ is the motion factor for the $m^{th}$ frame.

In the invention, the motion detection is based on the composite video signal without separation of luma and chroma. As a result, the motion detection can be precisely judged, and the advantage for the 3D comb filter video decoder can have full performance.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings

DETAILED DESCRIPTION

Figure 1:
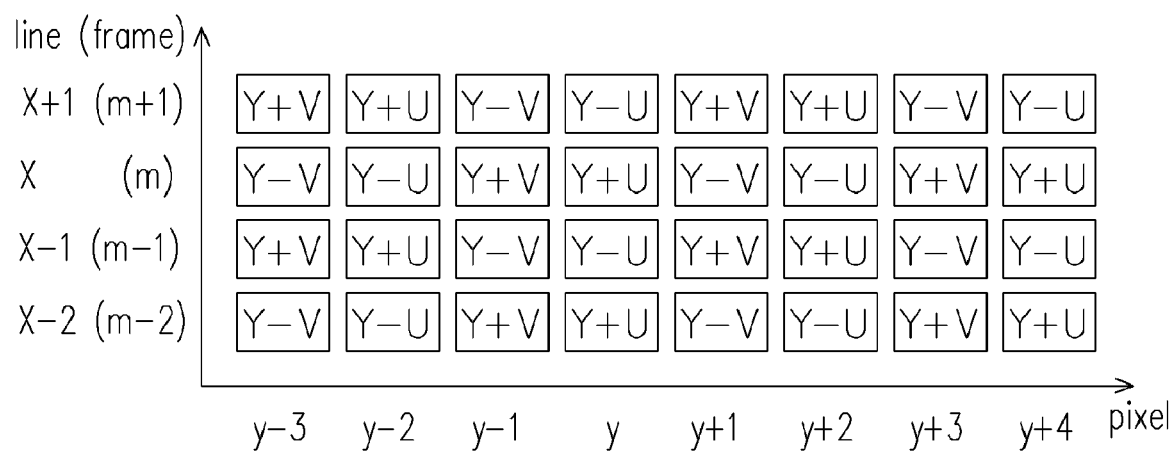
FIG. 1 is a drawing, schematically illustrating a portion of sampling result in the frame for the NTSC system.
Figure 2A:
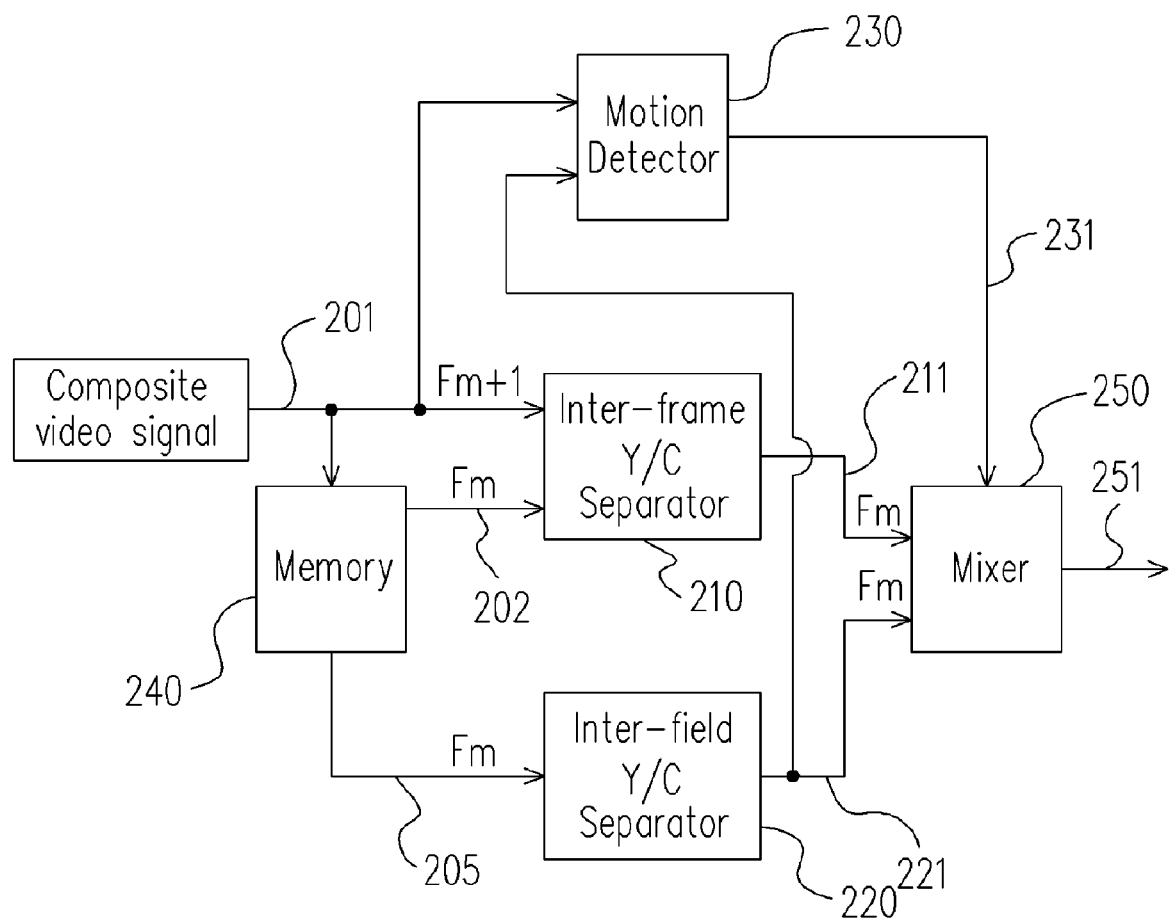
FIG. 2A is a block diagram, schematically illustrating the conventional 3D comb filter.
Figure 2B:
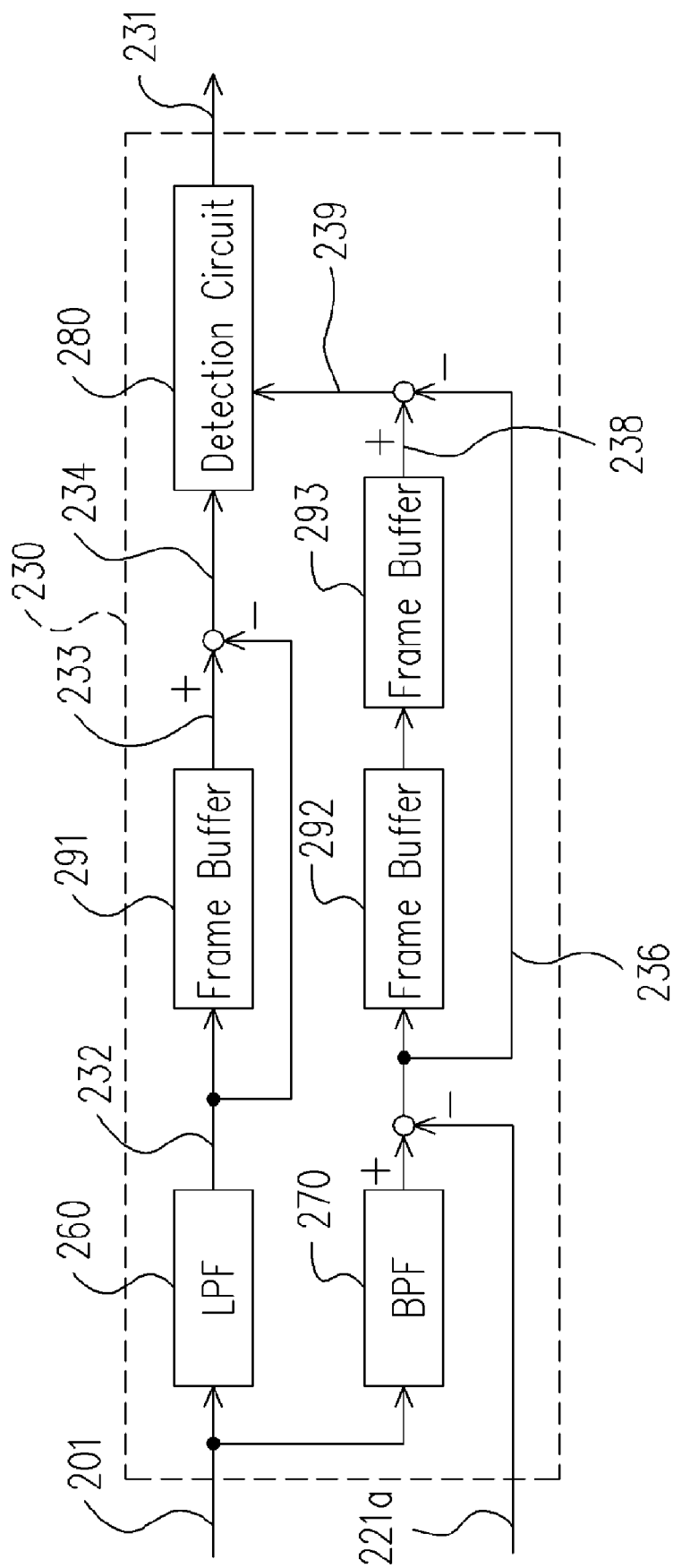
FIG. 2B is a block diagram, illustrating the conventional motion detector for the 3D comb filter.
Figure 3:
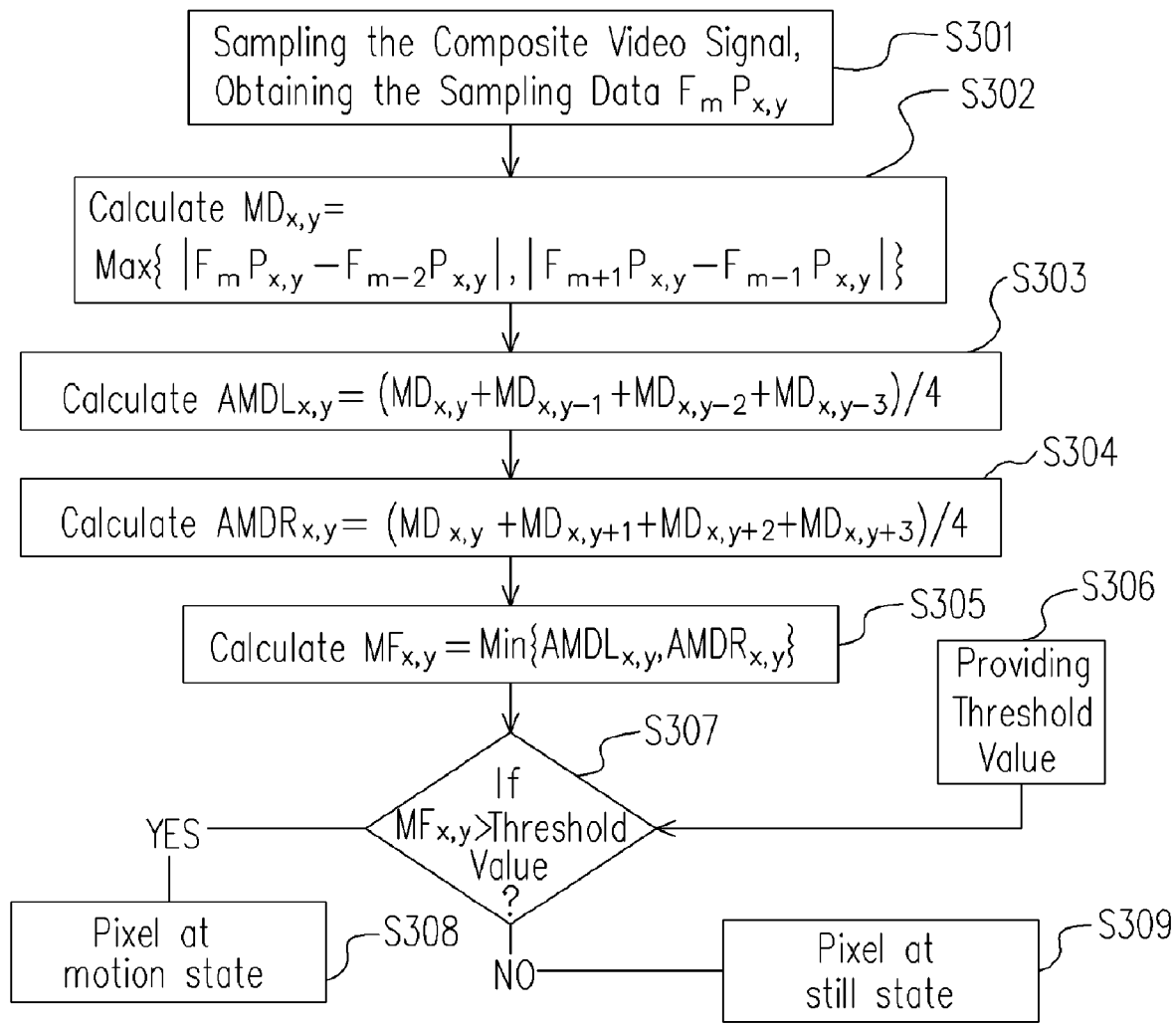
FIG. 3 is a process diagram, schematically illustrating the method of motion detection for a 3D comb filter video decoder under NTSC system, according to an embodiment of the invention.

In the invention, a novel approach for robust motion detection is proposed. FIG. 3 is a process diagram, schematically illustrating the method of motion detection for a 3D comb filter video decoder under NTSC system, according to an embodiment of the invention. Referring to FIG. 1 and FIG. 3, in step S301, the composite video signal is sampled to obtain multiple sampling data $F_m P_{x,y}$, which represents the $y^{th}$ pixel of the $X^{th}$ line in the $m^{th}$ frame, in which m, x, y are positive integer. In the embodiment under the NTSC, a sampling frequency is, for example, four times of the frequency of the composite video signal, for sampling at the phases of 0, 0.5π, π, and 1.5π of the subcarrier signal.

In step S302, the maximum difference $MD_{x,y}$ is calculated by $MD_{x,y}=\text{Max}\{|F_m P_{x,y}-F_{m-2}P_{x,y}|, |F_{m+1}P_{x,y}-F_{m-1}P_{x,y}|\}$, wherein $MD_{x,y}$ is the maximum difference for the $y^{th}$ pixel of the $x^{th}$ line. In the embodiment, the $MD_{x,y}$ is for example the maximum difference for the $m^{th}$ frame. The NTSC system, which has the vertical axis for frame and the horizontal axis for pixel, is taken as the example shown in FIG. 1. The $y^{th}$ pixels for the frame m and the previous second frame m−2 have the quantities of Y+U, but have the quantities of Y−U for the previous first frame m−1 and the advanced first frame m+1. A subtraction is performed between Y+U and Y+U, and an absolute value is taken for average. Also, a subtraction is performed between Y−U and Y−U, and an absolute value is taken for average. The larger one of the two absolute values is the $MD_{x,y}$.

However, it is insufficient to only use the maximum difference $MD_{x,y}$ of each pixel for the motion factor. This is because each sampling point represents a different character. It is assumed that each pixel is red for the frame m+1, and the pixels for the other frames are white. The luma Y for white color is much larger than the luma Y for red color, and the chroma V for red color is much larger than the chroma V for white color, and the chroma U for both has slight difference but without significant difference. In this situation, if the Y+V for the white color is compared with Y+V for the red color, the difference is small. However, if the Y−V for the white color is compared with Y−V for the red color, the difference is exceptional large. In addition, if the Y+U is compared with Y−U, the difference is small. In other words, for the same color A and the same color B to be compared, if the comparing item is different, the compared results have the differences. If the motion factor is determined according to each pixel itself, a sine wave for the values of the motion factor would appear. In this consideration, four pixels as a group are used to determine the values of motion factor.

For the foregoing reasons, after the maximum difference $MD_{x,y}$ for each pixel is calculated out, the maximum differences $MD_{x,y}$ for any adjacent four pixels are taken for calculating the average, (wherein the maximum difference for the target pixel is included). A minimum from the averaged values is selected to serve as the motion factor. The calculation formula is, for example, $AMD_{x,h}=(MD_{x,h}+MD_{x,h+1}+MD_{x,h+2}+MD_{x,h+3})/4$ and $MF_{x,y}=\text{Min}(AMD_{x,y}, AMD_{x,y-1}, AMD_{x,y-2}, AMD_{x,y-3})$, in which $AMD_{x,h}$ represents the averaged maximum difference for the $h^{th}$ pixel of the $x^{th}$ line, and $MD_{x,y}$ represents the motion factor for the $y^{th}$ pixel of the $x^{th}$ line. In the embodiment, only the left averaged maximum difference $AMDL_{x,y}$, that is, $AMD_{x,y-3}$, and the right averaged maximum difference $AMDR_{x,y}$, that is, $AMD_{x,y}$ as the examples for respectively calculating the $AMDL_{x,y}$ (step S303) and $AMDR_{x,y}$ (step S304). In step S305, the minimum of the $AMDL_{x,y}$ and $AMDR_{x,y}$ is taken as the motion factor by $MF_{x,y}=\text{Min}(AMDL_{x,y}, AMDR_{x,y})$. The reason to take the minimum is that since the motion factor for the pixel $P_{x,y}$ is affected by about 7 adjacent pixels. If the pixel $P_{x,y}$ is at still state, it does not wants to be affected by the adjacent pixel, causing an error judgement as a motion state. Therefore, taking the minimum form those averaged maximum differences to treat as the motion factor is proper.

Before judging whether the composite video signal is at the motion state or the still state, a threshold is provided (step S306). In step S307, the motion factor is compared with the threshold. In step S308, if the motion factor is significantly greater than the threshold, then it is determined as a motion state. In step S309, if the motion factor is significantly less than the threshold, then it is determined as a still state.

Figure 4:
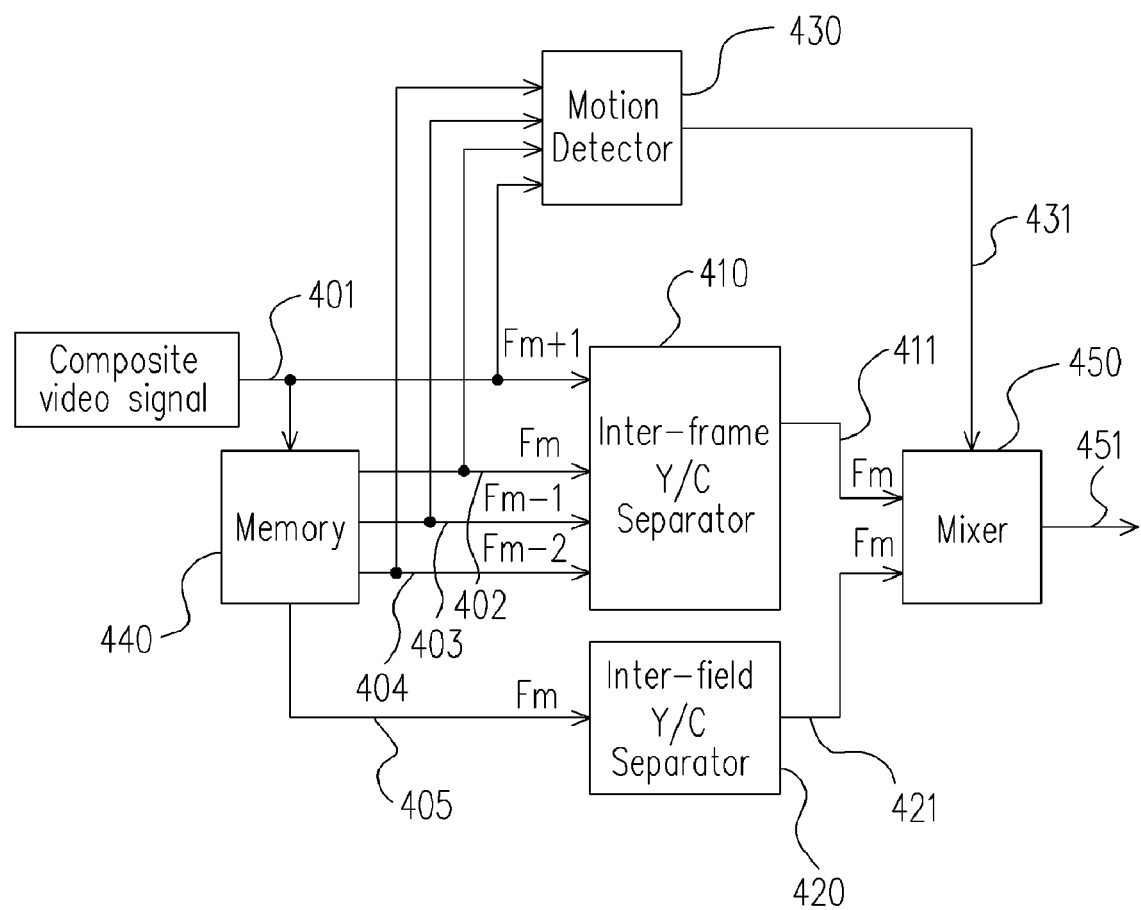
FIG. 4 is a block diagram, schematically illustrating the application of the method of motion detection for a 3D comb filter video decoder under NTSC system, according to an embodiment of the invention.

In summary, application of the method of motion detection for a 3D comb filter video decoder is described by block diagram. FIG. 4 is a block diagram, schematically illustrating the application of the method of motion detection for a 3D comb filter video decoder under NTSC system, according to an embodiment of the invention. In FIG. 4, the application of the invention of the motion detection for a 3D comb filter video decoder includes several interframe Y/C separator 410, intra-field Y/C separator 420, that is, 2D comb filter, motion detector 430, memory 440, and mixer 450. The motion detector 430 includes the features of the invention. The composite video signal 401 is obtained by sampling, wherein $F_{m+1}$ represents the composite video signal 401 for the $(m+1)^{th}$ frame. The memory 440 stores the composite video signal 401 and provides the composite video signal 402 for the $m^{th}$ frame $F_m$, the composite video signal 403 for the $(m-1)^{th}$ frame $F_{m-1}$, and the composite video signal 404 for the $(m-2)^{th}$ frame $F_{m-2}$. The memory 440 also separately provides a composite video signal 405 for the $m^{th}$ frame $F_m$. The intra-field Y/C separator 420 receives the composite video signal 405, and uses the space relation between the pixels in the frame $F_m$ to perform the Y/C separation, and then exports the separated video signal 421.

The luma and chroma of the motion video signal is separated by the intra-field Y/C separator 420. In order to improve the image quality, the still video signal is processed by the inter-frame Y/C separator 410. The inter-frame Y/C separator 410 simultaneously receives the sampling data of the composite video signal for the frames $F_{m+1}$, $F_m$, $F_{m-1}$, and $F_{m-2}$, and uses the space relation between the corresponding pixels in the adjacent frames, so as to perform the separation of luma and chroma and then export the separated video signal 411. The function for judging the composite video signal 401 to be motion state or still state is performed by the motion detector 430. The motion detector 430 receives the sampling data for the frames $F_{m+1}$, $F_m$, $F_{m-1}$, and $F_{m-2}$ in the composite video signal, so as to judge whether the pixel is at the motion state or the still state, and then the selection signal 431 is exported. The judging method is similar to the foregoing description, and is not further described. The mixer 450, according to the selection signal 431, selects the separated video signal 421, the separated video signal 411, or a mix of these two signals with a predefined ratio, so as to export the separated video signal 451.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

The invention claimed is:

1. A method of motion detection for a 3D comb filter video decoder, suitable for use in a National Television Standards Committee (NTSC) system, the method comprising:
   sampling a composite video signal to obtain and register a plurality of sampling data $F_m P_{x,y}$, wherein $F_m P_{x,y}$ represents a sampling data of the composite video signal from the $m^{th}$ frame in $x^{th}$ line at $y^{th}$ pixel; and
   judging whether the composite video signal to be a motion state or a still state, according to the sampling data of $F_{m+1} P_{x,y}$, $F_m P_{x,y}$, $F_{m-1} P_{x,y}$, and $F_{m-2} P_{x,y}$, comprising:
      using the sampling data of $F_{m+1} P_{x,y}$, $F_m P_{x,y}$, $F_{m-1} P_{x,y}$, and $F_{m-2} P_{x,y}$ to calculate and obtain a plurality of maximum differences $MD_{x,y}$, wherein $MD_{x,y}$ represents the maximum difference for the $y^{th}$ pixel in the $x^{th}$ line;
      selecting the maximum differences for any adjacent four pixels to take an average, for obtaining a plurality of motion factors $MF_{x,y}$, wherein $MF_{x,y}$ represents the motion factor for the $y^{th}$ pixel in the $x^{th}$ line; and
      detecting the motion factor $MF_{x,y}$ to judge whether the composite video signal to be the motion state or the still state.

2. The method of motion detection recited in claim 1, wherein the step of sampling the composite video signal comprises using a sampling frequency, which is four times of a subcarrier signal of the composite video signal, to sample, wherein the subcarrier signal is sampled at phase angles of 0, 0.5π, π, and 1.5π.

3. The method of motion detection recited in claim 2, wherein the $MD_{x,y}$ is calculated by $MD_{x,y} = \text{Max}\{|F_m P_{x,y} - F_{m-2} P_{x,y}|, |F_{m+1} P_{x,y} - F_{m-1} P_{x,y}|\}$.

4. The method of motion detection recited in claim 3, wherein the $MF_{x,y}$ is obtained by:
   selecting the maximum differences for any adjacent four pixels including the $MD_{x,y}$, and taking an average, so as to obtain a plurality of averaged maximum differences $AMD_{x,h}$, wherein the $AMD_{x,h}$ represents the average maximum differences for the $h^{th}$ pixel of the $x^{th}$ line, in which h is a positive integer, and a calculation formula of $AMD_{x,h} = (MD_{x,h} + MD_{x,h+1} + MD_{x,h+2} + MD_{x,h+3})/4$ is used; and
   taking a minimum from the averaged maximum differences, so as to obtain a motion factor $MF_{x,y}$, wherein $MF_{x,y}$ represents the motion factor for the $y^{th}$ pixel of the $x^{th}$ line.

5. The method of motion detection recited in claim 4, wherein a minimum is obtained from a number of the adjacent averaged maximum differences and the $MF_{x,y}$ is obtained by $$MF_{x,y} = \text{Min}(AMD_{x,y}, AMD_{x,y-1}, AMD_{x,y-2}, AMD_{x,y-3}).$$

6. The method of motion detection recited in claim 4, wherein a minimum is obtained from a number of the adjacent averaged maximum differences and the $MF_{x,y}$ is obtained by $$MF_{x,y} = \text{Min}(AMD_{x,y}, AMD_{x,y-3}).$$

7. The method of motion detection recited in claim 4, wherein the step of detecting the motion factor $MF_{x,y}$ to judge whether the composite video signal to be the motion state or the still state for the $y^{th}$ pixel in the $x^{th}$ line comprises:
   providing a threshold value; and
   comparing the $MF_{x,y}$ with the threshold value, wherein the $y^{th}$ pixel in the $x^{th}$ line of the composite video signal is judged as the motion state when the $MF_{x,y}$ is greater than the threshold value, otherwise the still state is judged.

8. The method of motion detection recited in claim 7, wherein the $MF_{x,y}$ is the motion factor for the $m^{th}$ frame.

* * * * *